US010158765B2

(12) United States Patent
Fan et al.

(10) Patent No.: US 10,158,765 B2
(45) Date of Patent: *Dec. 18, 2018

(54) PARTY LOCATION BASED SERVICES

(71) Applicant: AT&T Intellectual Property I, L.P., Atlanta, GA (US)

(72) Inventors: James Fan, San Ramon, CA (US); Thomas Barrett, San Ramon, CA (US); Jennifer Lam, Fremont, CA (US); Hieu Le, Danville, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/245,862

(22) Filed: Aug. 24, 2016

(65) Prior Publication Data
US 2016/0366284 A1 Dec. 15, 2016

Related U.S. Application Data

(63) Continuation of application No. 13/112,114, filed on May 20, 2011, now Pat. No. 9,451,081.

(51) Int. Cl.
*H04M 15/00* (2006.01)
*H04M 3/42* (2006.01)
*H04L 29/08* (2006.01)
*H04L 29/12* (2006.01)

(52) U.S. Cl.
CPC ...... *H04M 15/8033* (2013.01); *H04L 61/605* (2013.01); *H04L 67/18* (2013.01); *H04M 3/42042* (2013.01); *H04M 3/42093* (2013.01); *H04M 3/42357* (2013.01)

(58) Field of Classification Search
CPC ......... H04M 3/436; H04M 2215/0168; H04M 15/00; H04M 15/06; H04M 15/08; H04M 15/56; H04M 15/745; H04M 15/88; H04M 1/72519; H04M 2201/40; H04M 2215/0108; H04M 2215/0116; H04M 2215/202; H04M 2215/62
USPC ......... 379/114.02, 114.17, 115.01, 111, 219, 379/142.1
See application file for complete search history.

(56) References Cited

U.S. PATENT DOCUMENTS 7,805,147 B1    9/2010   Rosen et al.
8,036,356 B1   10/2011   Ghosh et al.
2003/0119522 A1 6/2003   Barclay et al.
(Continued)

*Primary Examiner* — Akelaw Teshale
(74) *Attorney, Agent, or Firm* — Baker & Hostetler LLP

(57) ABSTRACT

Services are provided based on the locations, rather than the NPA.NXX identifiers, of called and calling parties. Party location based services can be provided to the called party, to the calling party, or both. Services can include an indication of the location of each party. Services also can include an indication of charges as determined by the location of the parties, rather than the NPA.NXX identifiers. Services can be provided if the parties are using a mobile communications devices, such as a cellular phone, wireline systems (e.g., landline phones), or a combination thereof. In an example configuration, location can be provided in a hierarchy of various levels of accuracy/precision. Different levels can be representative of different resolutions of geography. An example system for facilitating party location based services includes a signaling system number 7 (SS7) network.

14 Claims, 14 Drawing Sheets

(56) References Cited

U.S. PATENT DOCUMENTS

| | | |
|---|---|---|
| 2004/0249649 A1 | 12/2004 | Stratton |
| 2004/0257274 A1 | 12/2004 | Benco et al. |
| 2005/0043042 A1 | 2/2005 | Hwang et al. |
| 2008/0112551 A1 | 5/2008 | Forbes et al. |
| 2008/0152091 A1* | 6/2008 | Kivimaki ............... H04Q 3/66 379/45 |
| 2008/0194260 A1 | 8/2008 | Altberg |
| 2009/0074175 A1 | 3/2009 | Wellons et al. |
| 2009/0110166 A1 | 4/2009 | Urban et al. |
| 2010/0098237 A1* | 4/2010 | Contractor ........ H04M 3/42263 379/211.02 |
| 2010/0157986 A1* | 6/2010 | Rao .................... H04L 29/1216 370/352 |
| 2010/0183134 A1* | 7/2010 | Vendrow ........... H04M 3/42348 379/201.06 |
| 2010/0304707 A1 | 12/2010 | Bolin |
| 2011/0044444 A1* | 2/2011 | Abramson ............... G06F 9/543 379/207.02 |
| 2011/0255677 A1 | 10/2011 | Kasad |
| 2012/0294434 A1 | 11/2012 | Fan et al. |

* cited by examiner

| Location ID Level | Generic Description | Location ID Sample |
|---|---|---|
| Default | Continent, Country, State, Metropolitan | North_America.USA.CA |
| Level 2 | Area of multiple counties or Single County | CA.Bay_Area or CA.Bay_Area.Santa_Clara |
| Level 3 | Multiple Cities or Towns or a single City/Town | CA.Bay_Area.Santa_Clara.Mountain_View |
| Level 4 | Street or Intersections | CA.Bay_Area.Santa_Clara.Mountain_View.Street one_Street_two |
| Level 5 | Living Unit Address | 2600 Camino Ramon, Room 100, San Ramon, CA 94583 |

FIGURE 2

PARTY LOCATION BASED SERVICES

CROSS-REFERENCE TO RELATED APPLICATIONS

This application is a continuation of and claims priority to U.S. application Ser. No. 13/112,114, filed May 20, 2011, the contents of which are hereby incorporated by reference in their entireties.

TECHNICAL FIELD

The technical field generally relates to telecommunications, and more specifically relates to providing services based on locations of calling and called parties.

BACKGROUND

Current telephone systems in the United States and Canada use the North American Number Plan (NANP) for establishing calls. Under the NANP, NPA.NXX identifiers are used. NPA.NXX refers to the first six digits in a phone number. NPA refers to the area code, and NXX refers to the exchange (three digits following the area code). Service providers use the NPA.NXX identifiers of each party (called party and calling party) to determine the rates to be charged for a call. Also, persons with caller ID have used the NPA.NXX identifiers to determine the origination of a call. However, with the widespread use of portable communications devices, such as cellular phones, VoIP, and local number portability features available in wireline systems (e.g., landline systems), the NPA.NXX identifiers may not accurately reflect the location of a party.

SUMMARY

Services are provided based on the locations, rather than the NPA.NXX identifiers, of called and calling parties. The phone number of a communications device being used by a calling party is not determinative of the location of the calling party. And, the phone number of a communications device being used by the called party is not determinative of the location of the called party. Party location based services can be provided to the called party, to the calling party, or both. Services can include an indication of the location of each party. For example, the location of a calling party can be provided to a called party, and/or the location of a called party can be provided to a calling party. In an example embodiment, locations are provided prior to the called party answering the call. Services also can include an indication of charges as determined by the location of the parties, rather than the NPA.NXX identifiers. Services can be provided if the parties are using a mobile communications devices, such as a cellular phone, wireline systems (e.g., landline phones), or a combination thereof. In an example configuration, location can be provided in a hierarchy of various levels of accuracy/precision. Different levels can be representative of different resolutions of geography. For example, a first level could be representative of a broad geographic resolution, such as a region (e.g., country, state, continent, etc.), a second level could be representative of a finer geographic resolution, such as a county, township, etc., a third level could be representative of an even finer geographic resolution, such as a city, building (e.g., apartment building, etc.), complex (e.g., shopping mall, college campus, corrections facility, a park, etc.), a fourth level could be representative of a building in a complex (building on a college campus, store in a shopping mall, etc.), a floor or a wing in a building, and a fifth level could be representative of a location as precise and accurate as allowed by the technology being used to determine the location (e.g., latitude and longitude, street corner intersection, etc.). Thus, each level can represent a finer geographic resolution. The level or levels can be configurable and selectable by the called party.

A party may subscribe to a party location based service. Parties may have the option to receive party location based services on a per call basis. Parties may be asked for consent. Party location based services can be provided for any appropriate type of call, such as, for example, voice calls, text based calls (e.g., SMS messages), or the like.

In an example embodiment, upon a call being established, the locations of both parties (calling party and called party) are determined. Charges associated the call (e.g., toll charges), based on the location of the parties rather than the NPA.NXX are determined, and if charges apply, the calling party is notified of the charges. If the calling party accepts the charges, or if no charges apply, information pertaining to the calling party and the called party are analyzed to determine if information (e.g., information pertaining to a party location based service) pertaining to one party is to be provided to the other party. And, if the analysis indicates that information is to be provided to a party, the appropriate information is provided to the appropriate party.

An example system for facilitating party location based services includes a signaling system number 7 (SS7) network, an address/location handler that handles requests for location information, a living unit address database that comprises information pertaining to the various levels of location information, a location coordinates mapping database that supports mapping of geographic coordinates to any of the levels of the location information, and a location correlator that obtains party information to determine appropriate services to be provided to the parties.

BRIEF DESCRIPTION OF THE DRAWINGS

FIG. 2 is a table depicting an example hierarchy of levels of location identification information that could be stored in living unit address database 26.

DETAILED DESCRIPTION OF ILLUSTRATIVE EMBODIMENTS

Figure 1:
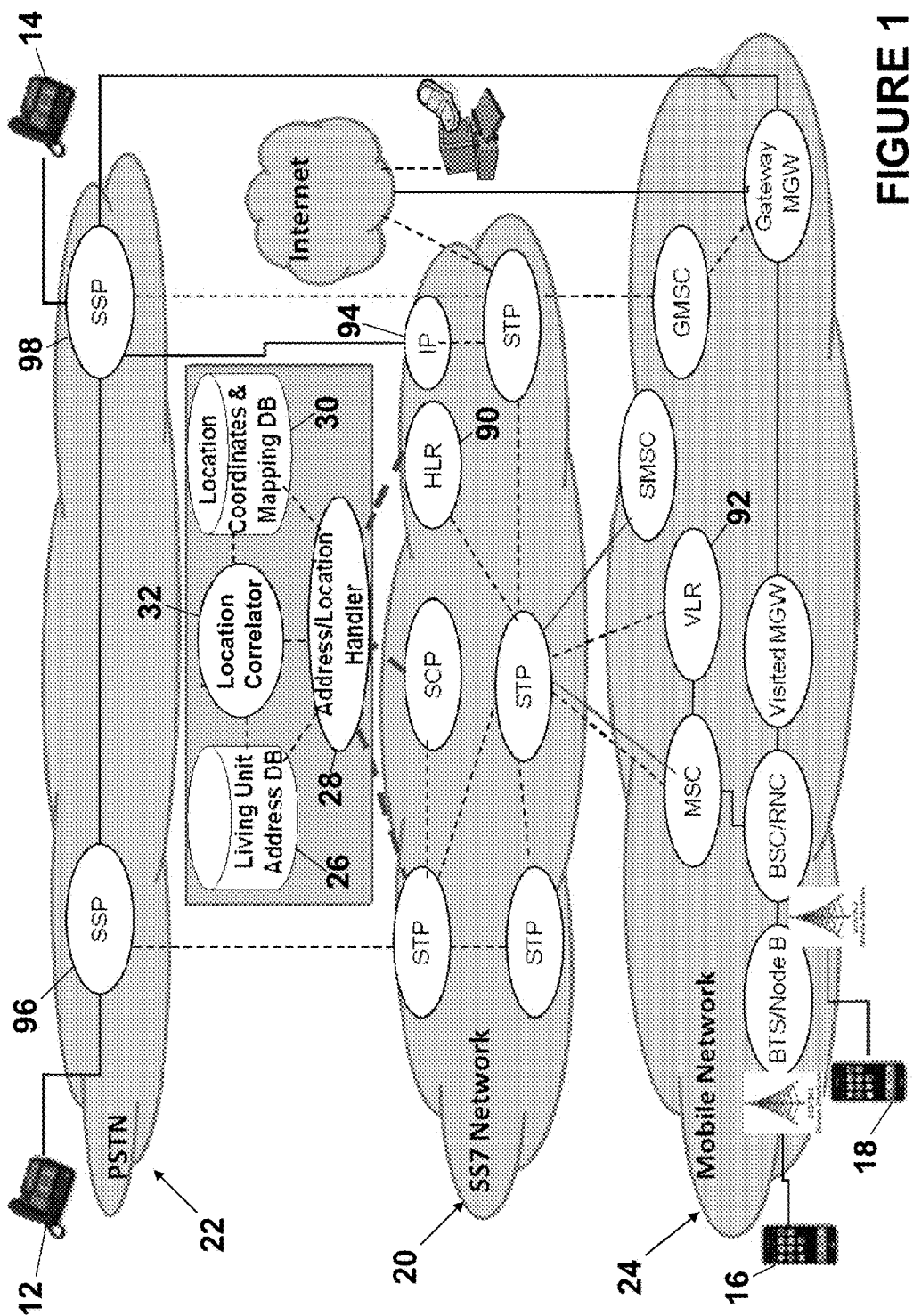
FIG. 1 is a diagram of an example system for providing party location based services.

FIG. 1 is a diagram of an example system for providing party location based services. The example system depicted in FIG. 1 comprises a signaling system number 7 (SS7) network 20, a public service telephone network PSTN 22, and a mobile network 24. It is to be understood that the depicted networks are exemplary, and that any appropriate networks could be utilized. For example, as explained in more detail herein, the mobile network 24 can comprise any of a variety of mobile networks. In order to provide party location based services as described herein, the example system depicted in FIG. 1 also comprises a living unit address database 26, an address/location handler 28, a location coordinates and mapping database 30, and a location correlator 32. The living unit address database 26, address/location handler 28, location coordinates and mapping database 30, and location correlator 32 can be implemented in any appropriate manner via any appropriate mechanism. For example, the living unit address database 26, address/location handler 28, location coordinates and mapping database 30, and location correlator 32 can be implemented via any appropriate processor, server, database, or any combination thereof.

Party based location services, as described herein, are applicable to a wide variety of situations. A few example applications or party based location services are provided. For example, when a call is originated from a retailer out of state call center, both the calling number and called number will be used to query the address/location handler 28. The address/location handler 28 can detect that the company has a retailer store near the called party home location, the originating (call center) location along with a near-by retailer detailed location can then be presented to a caller ID screen or the like of the called party. This can allow the called party to know there is a local retail store for him/her to shop in the future.

In another example application of party location based services, when a customer calls an 800 number to find nearby store locations, the calling party can issue a per call location request along with the call, the called party's phone number along with the per call location request (to match to the calling party) can be sent to the address/location handler 28. The address/location handler 28, working in conjunction with the living unit address database 26, the location coordinates and mapping database 30, and/or the location correlator 32, as needed can return an indication of a nearby location, such as an address and/or map that indicates a geographic location, of the same store chain. This location can then be rendered on the calling party's display device, or the like.

In another example application of party location based services, when a service company calls a family residence to offer services such as home inspection, window replacement, etc., the called party can be requested to release its home location so that the service company can send personnel to do the job. Thus, rather than the service company having to verbally obtain the location of the family residence, if the called party agrees to release its home address location, the information can be provided to the calling party (e.g., the service company).

In yet another example application of party location based services, a market survey company may call a sample of phone numbers with the same area code and receive an indication of the locations of the called parties. The called party locations provided to the calling party (e.g., the market survey company) will allow for a more accurate market analysis, as some residents may have moved out of the area code region and have retained previous telephone numbers.

In another example application of party location based services, a family may be concerned about the whereabouts of a relative, such as a grandmother. A per call or per called number location feature can be utilized in which, whenever a call from a set of specified calling parties (e.g., relatives, friends, etc.) reaches the called party's wireless handset, the location of the called party is returned to the calling party.

In an additional example application of party location based services, when a customer calls a takeout restaurant (e.g., pizza, Chinese food, etc.) even if the customer does not call an 800 number (for example the customer calls the local branch number of a restaurant chain), and the chain has subscribed to the party location based service, location lookups can be used to determine if there is a closer branch (closer to the customer's location) of the restaurant chain, and providing the customer with an indication of the closer location. This gives the customer the option to route the call to the closer destination, and can provide driving directions to the customer's smart phone, if desired.

The provisioning of party location based services is applicable to a wide variety of system configurations. For example the provisioning of party location based services is applicable to calls originated from a handset/wireless communications device and terminated to a public service telephone network (PSTN), calls originated from a telephone in the PSTN and terminated on a handset/wireless communications device, calls originated in the PSTN and terminated in the PSTN, call originated from a handset/wireless communications device and terminated on a handset/wireless communications device, calls originated via voice over Internet protocol (VoIP) technology, and terminated on a VoIP phone, or the like. Further, provisioning of party location based services can be utilized by various services, such as, for example, the short message service (SMS). When an SMS message is received, the message recipient can request the delivery of the sender's location information. Or, when an SMS message is sent, the calling party can request the location of the called party.

The PSTN 22 depicted in FIG. 1 is indicative of any appropriate PSTN. As such, PSTN 22 comprises circuit-switched telephone networks. PSTN 22 can comprise telephone lines, fiber optic cables, microwave transmission links, cellular networks, communications satellites, undersea telephone cable, or the like, for example. The service switching points (SSPs) depicted in FIG. 1 are indicative of any appropriate SSP. An SSP is a telephone exchange or switch that initially responds when a number is dialed. SSPs can work with a service control points (SCPs) and signal transfer points (STPs) to handle calls.

An STP routes messages between various entities in the SS7 network, such as signaling end points, SCPs, and other STPs. STPs also can route messages to entities in other networks. For example, as depicted in FIG. 1, STPS can route messages to and from the mobile network 24 and to and from the PSTN 22. SCPs help control service. SCPs can be used to query other entities in a network to obtain numbers to which calls are being routed. An SCP also can interface with an intelligent peripheral (IP) to play voice messages or prompt a user for information.

In an example embodiment, the address/location handler 28 handles requests for location identification information. That is, the address/location handler 28 can coordinate requests for location information by, receiving requests, obtaining information as needed via the living unit address database 26, the location coordinates and mapping database 30, and/or the location correlator 32, and providing responses to requesters. Further, the address/location handler 28 can receive information pertaining to location identification information (e.g., updates). As depicted in FIG. 1, the address/location handler 28 can accept requests for location information (location ID requests) from external sources such as an STP, an SCP, and/or a home location register (HLR). An HLR contains information about each subscriber authorized to use a network. For example, an HLR can contain information about each subscriber identity module (SIM) card issue by an operator of a network. The address/location handler 28 also can support non-SS7 interfaces for other location mapping needs (e.g., session initiation protocol, SIP, interface, HTTP interface, etc.

In an example embodiment, the living unit database 26 comprises information pertaining to the various levels of accuracy/precision of the location identification information. And, the location coordinates mapping database 30 can support mapping of geographic coordinates to any of the levels of location identification and/or mapping of the levels of location identification to geographic coordinates.

In an example configuration, the living unit address database 26 contains at least a table with phone number-to-address mapping for each of the location levels (e.g., as depicted in FIG. 2). The location coordinates and mapping database 30 contains at least a table with geolocation code-to-real address mapping for each of the location levels (e.g., as depicted in FIG. 2). The address/location handler 28 acts as a gateway to receive location requests, phone numbers (e.g., NPA.Nxx numbers), etc. When a location is queried for, the party number (calling and/or called party depending upon the service being requested) along with the geolocation coordinates (for a party utilizing a mobile communications device, such as a cell phone, lap top, etc.) is provided. For a wireless call, the geolocation codes can be sent to location coordinates and mapping database 30, which can provide mapped location information back to the requestor. The location information may not contain a specific living unit address but rather, an indication of a geographic location, such as, for example, 50 feet from N street and 100 feet from Irving street in San Francisco. For a landline phone, the party number will be routed to living unit address database 26, which will map the party number to an exact address such as 101 Cavendish Drive, Cary, N.C.

In an example embodiment, the location correlator 32 provides correlation services to determine if the calling party's location and called party's location are served by the same local calling area. The location correlator 32 can obtain handset location from the location coordinates and mapping database 30 and associate the information to obtain a default location from the living unit address database 26. The location correlator 32 also can provide correlation services to map wireless coordinates to a living unit region or address. For example, the location correlator 32 can receives requests from the address/location handler 28, and obtain both calling party location and called party location to determine if a toll charge is involved. Or, alternatively, the called party location (e.g., network address—local routing number) can be returned to the local calling switch to determine if a toll charge is applicable. As another example, the location correlator 32 can obtain a called party's default location as well as a detailed location of a chain store (by correlating the calling party location to near-by called party's chain store).

In an example configuration, the location of the calling party and/or called party can be provided in a hierarchy of various levels of accuracy/precision, wherein different levels can be representative of different geographic resolutions (e.g., as depicted in FIG. 2). And, the living unit address database 26 can comprise information pertaining to the various levels of geographic resolutions of the location identification information.

FIG. 2 is a table depicting an example hierarchy of levels of location identification information that could be stored in living unit address database 26. For example, as depicted in FIG. 2, location identification information can be provided in five (5) levels, each level having a different geographic resolution (granularity of accuracy and/or precision). As depicted in FIG. 2, the first level, which can be a default level, can be indicative of a continent, country, state, or metropolis. As depicted in FIG. 2, an example continent is North America, an example country is the United States of America (USA), and an example state is California (CA).

Further as depicted in FIG. 2, a second level can be indicative of a multiple counties or a single county, such as the California bay area and/or Santa Clara in the California bay area. A third level can be indicative of multiple cities, multiple towns, a single city, and/or a single town. An example includes Mountain View in Santa Clara in the bay area of California. A fourth level could be indicative of street or an intersection, such as, for example, the intersection of street two and street one of Mountain View in Santa Clara in the bay area of California. And, a fifth level could be indicative of a living unit address such as 2600 Camino Ramon, Room 100, San Ramon, Calif. 94583.

A party may select one of the levels of the plurality of levels depicted in FIG. 2. A party could select a range of levels (e.g., level 2 or higher). A party can subscribe to a service that provides the various levels depicted in FIG. 2.

Figure 3:
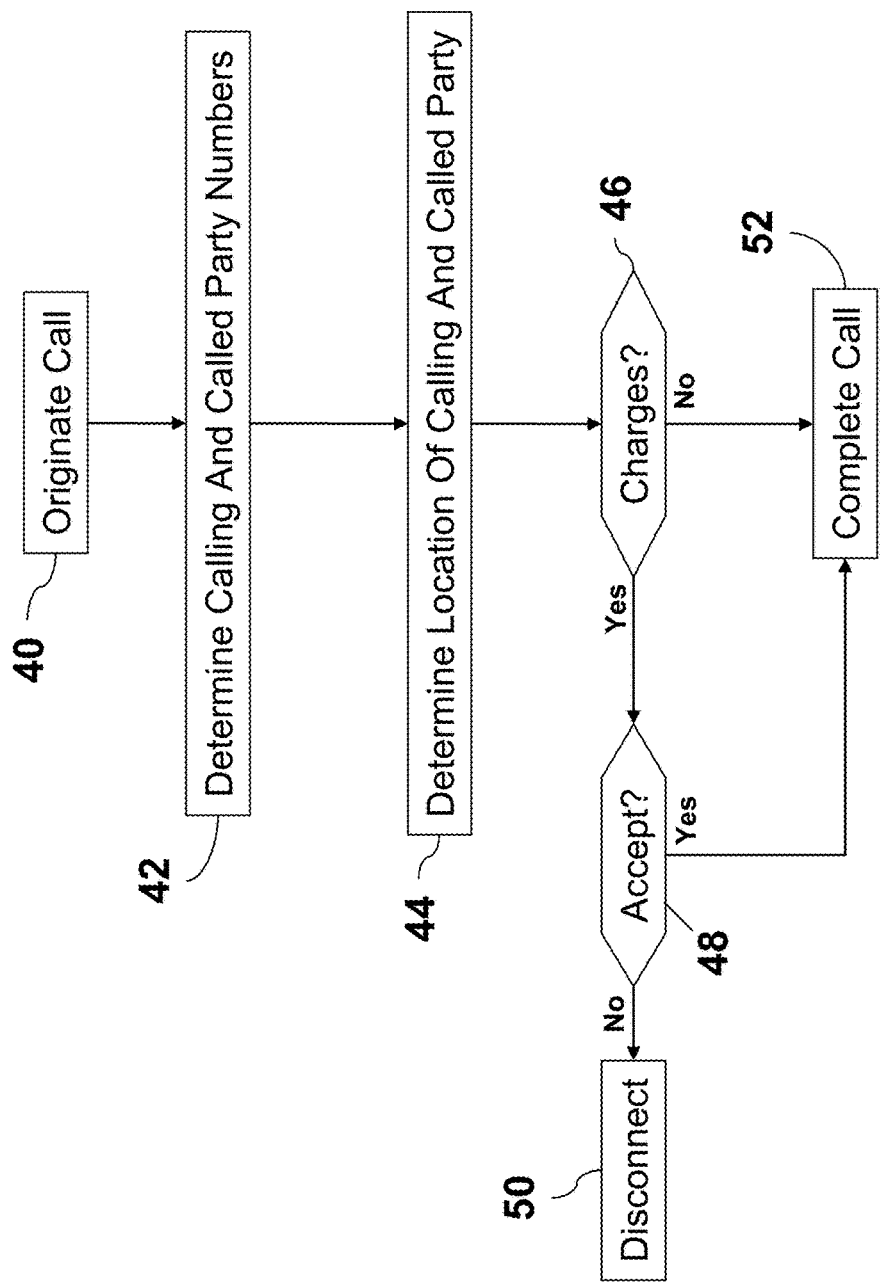
FIG. 3 is a flow diagram of an example process for facilitating party location based services in which party location based services may be subscribed for and/or triggered on a per call basis.

FIG. 3 is a flow diagram of an example process for facilitating party location based services in which party location based services may be subscribed for and/or triggered on a per call basis. To implement party location based services in an example embodiment, a call is originated at step 40. Both the calling party's and called party's numbers are determined at step 42. The calling party's and called party's numbers could be, for example, the numbers associated with communications device 12, 14, 16, or 18 depicted in FIG. 1. The calling party's and called party's numbers are used to determine the location of the calling and called parties at step 44. For example, the calling party's and called party's numbers can be used to query the address/location handler 28. The address/location handler 28 can provide the locations (of the called and/or calling party) to the requester. At step 46, it is determined if any charges apply. For example, upon receiving a request, the address/location handler 28 can send a request to the location correlator 32 which can obtain both calling party location and called party location from the living unit address database 26 and/or the location coordinates and mapping database 30, to determine if a toll charge is involved. Or, alternatively, the called party location (e.g., network address—local routing number) can be returned to the local calling switch to determine if a toll charge is applicable. The local calling switch may send an announcement to let the calling party know if there is a toll fee for the call, even though both the calling and called party may have the same NPA or NPA.Nxx code. For example, the called party may have moved to a remote location where a toll charge is applied.

If charges apply (step 46), the local calling switch can send an announcement to let the calling party know that there is a toll fee for the call (note: optionally, the announcement can be played via an IP in the SS7 network). If charges apply (step 46), and the calling party does not accept the charges (step 48), the call is disconnected at step 50. If charges apply (step 46) and if the calling party agrees to the charge (step 48), the call processing can proceed to step 52. If no charges apply (step 46), the call processing can proceed to step 52. At step 52, the call can be completed to the called party. If charges applied and the calling party agreed to accept the charges, the call can be logged with the calling party's consent when the called party answers, the toll charge measurement process can be invoked.

Figure 4:
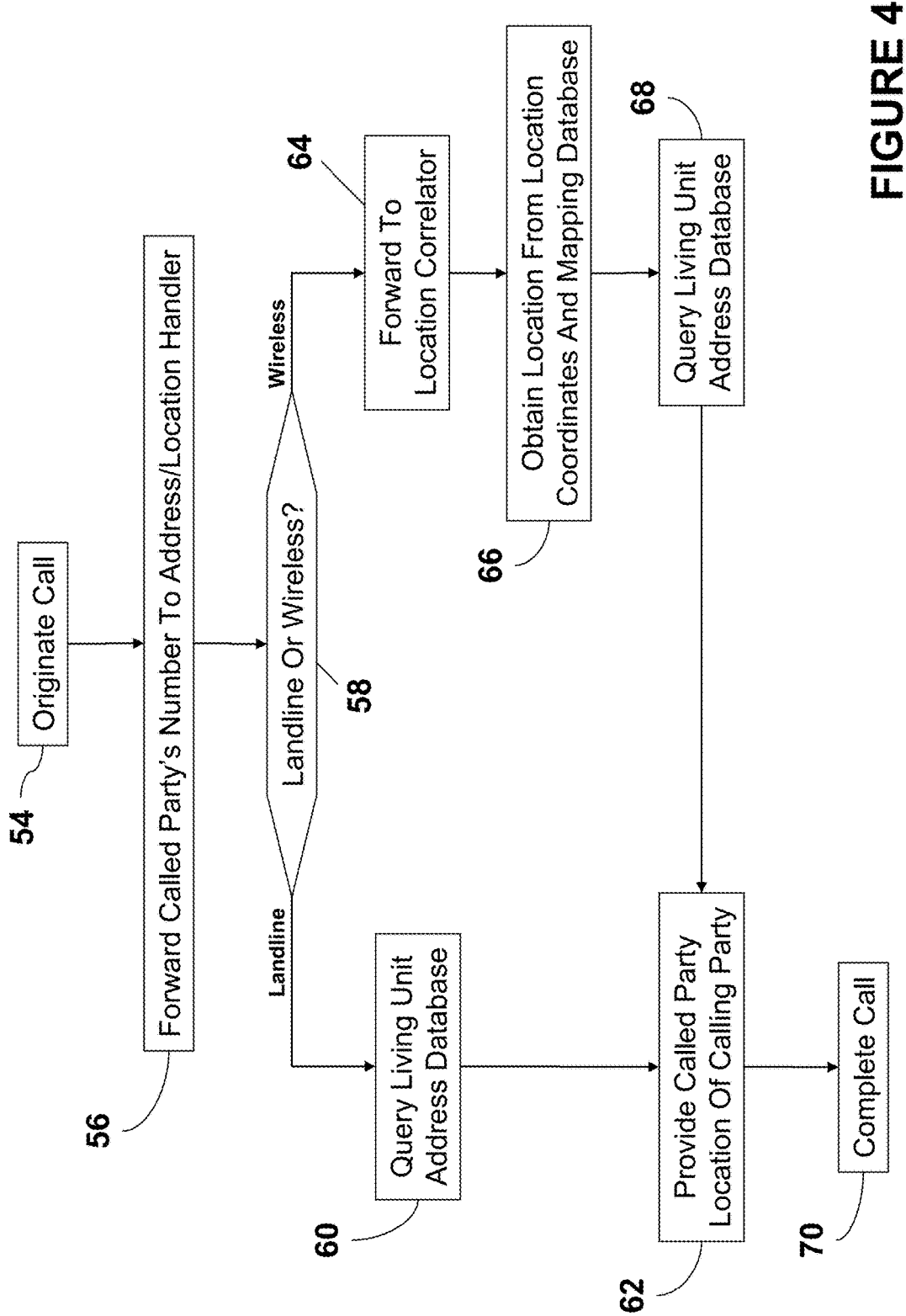
FIG. 4 is a flow diagram of an example process for facilitating party location based services in which party location based services may be subscribed-for, but the called party may not allow detailed location information to be returned to the calling party.

FIG. 4 is a flow diagram of an example process for facilitating party location based services in which party location based services may be subscribed-for, but the called party may not allow detailed location information to be returned to the calling party. In this example scenario, the calling party initiates a call to a called party's number, at step 54. At step 56, the called party's phone number is forwarded to the address/location handler 28. At step 58, it is determined if the called party's number is representative of a landline phone (communications device) or a wireless (e.g., cellular) phone (communications device). If it is determined that the called party's number is used by a landline phone (step 58), the living unit address database 26 can be queried at step 60. The living unit address database 26 can be queried for the default level of the called party's location (e.g., default level as depicted in FIG. 2). And, the process proceeds to step 62. If it is determined that the called party's number is representative of a wireless phone (step 58), the request is forwarded to the location correlator 32 at step 64. The location correlator 32 obtains the wireless phone location from the location coordinates and mapping database 30 at step 66. The location correlator 32 associates the information received from the location coordinates and mapping database 30 to obtain a location from the living unit address database 26 at step 68. The called party's location is provided to the calling party at step 62. In an example embodiment, the location is provided prior to the called party answering the call. The location can be rendered on the communication device of the calling party, visually (display), acoustically (sound), mechanically (vibration), or any combination thereof. The call is connected to the called party's communications device at step 70. In an example embodiment, the called party's location information can be stored in an HLR or be fetched from a VLR, and the location information could be obtained via triangulation, time or arrival calculations, GPS, or the like.

Figure 5:
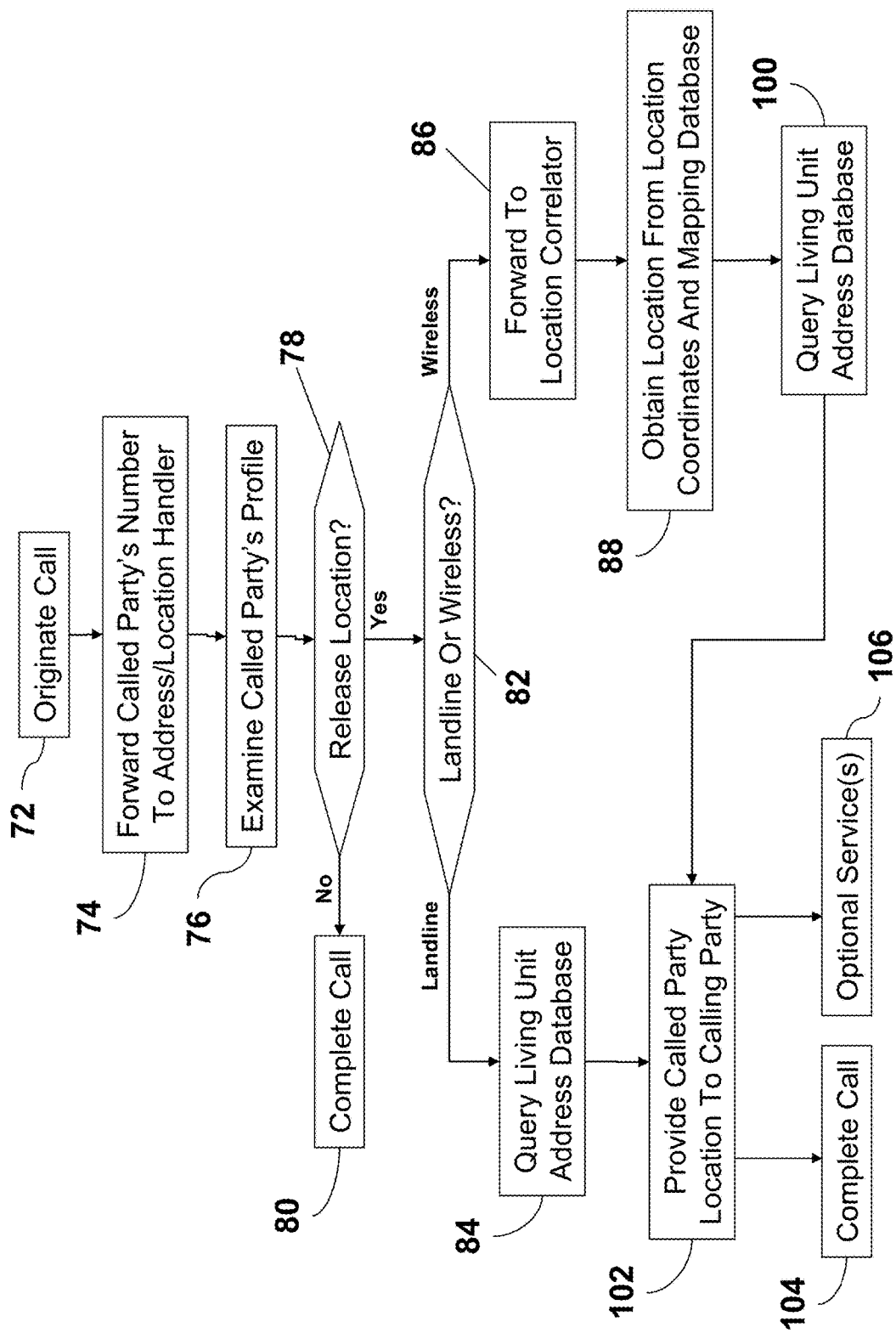
FIG. 5 is a flow diagram of an example process for facilitating party location based services in which party location based services may be subscribed-for, and the called party may choose to release his/her detailed location to a preconfigured list of calling numbers, or to all calling parties.

FIG. 5 is a flow diagram of an example process for facilitating party location based services in which party location based services may be subscribed-for, and the called party may choose to release his/her detailed location to a preconfigured list of calling numbers, or to all calling parties. In this example scenario, the calling party initiates a call to a called party's number at step 72. The called party's phone number is forwarded to the address/location handler 28 at step 74. The called party's profile is examined at step 76. At step 78, it is determined if the called party agrees to release his/her location information. If the called party does not agree to release his/her location information (step 78), the call is completed without providing location information at step 80. In this example scenario, examination of the called party's profile indicates that the called party prefers to release his/her detailed location to the calling party (step 78), and the process proceeds to step 82.

At step 82, it is determined if the called party's number is representative of a landline phone (communications device) or a wireless (e.g., cellular) phone (communications device). If it is determined that the called party's number is used by a landline phone (step 82), the living unit address database 26 can be queried at step 84. The living unit address database 26 can be queried for the default level of the called party's location (e.g., default level as depicted in FIG. 2). And, the process proceeds to step 102. If it is determined that the called party's number is representative of a wireless phone (step 82), the request is forwarded to the location correlator 32 at step 86. The location correlator 32 obtains the wireless phone location from the location coordinates and mapping database 30 at step 88. The location correlator 32 associates the information received from the location coordinates and mapping database 30 to obtain a location from the living unit address database 26 at step 100. The called party's location is provided to the calling party at step 102. In an example embodiment, the location is provided prior to the called party answering the call. The location can be rendered on the communication device of the calling party, visually (display), acoustically (sound), mechanically (vibration), or any combination thereof. The call is connected to the called party's communications device at step 104. In an example embodiment, the called party's location information can be stored in an HLR or be fetched from a VLR, and the location information could be obtained via triangulation, time or arrival calculations, GPS, or the like. In an example embodiment, the called party's location can optionally be fed to an application for enhanced services at step 106. For example, the location can be provided to a mapping service to allow the calling party to reach the called party's address via turn-by-turn directions.

Figure 6:
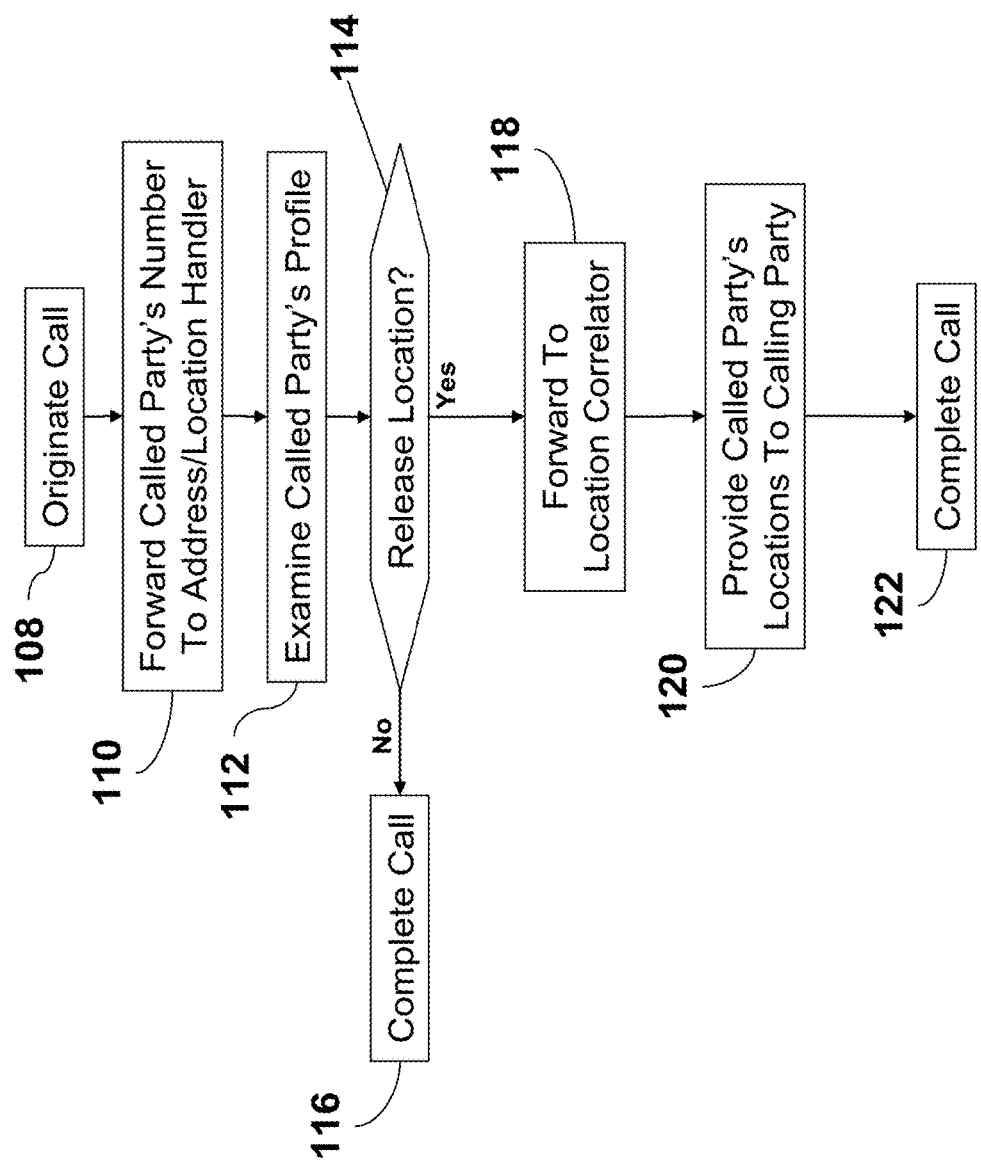
FIG. 6 is a flow diagram of an example process for facilitating party location based services in which party location based services may be subscribed-for, and the called party may choose to release an alternate detailed location to a preconfigured list of calling numbers, or to all calling parties.

FIG. 6 is a flow diagram of an example process for facilitating party location based services in which party location based services may be subscribed-for, and the called party may choose to release an alternate detailed location to a preconfigured list of calling numbers, or to all calling parties. In this example scenario, the calling party initiates a call to a called party's number at step 108. The calling party's and called party's phone numbers are forwarded to the address/location handler 28 at step 110. The called party's profile is examined at step 112. At step 114, it is determined if the called party agrees to release his/her location information. If the called party does not agree to release his/her location information (step 114), the call is completed without providing location information at step 116. In this example scenario, examination of the called party's profile indicates that the called party prefers to release a default level of location as well as an alternate detailed location (e.g., a location closer to the calling party's location) to the calling party. The request is forwarded to location correlator 118, which obtains the called party's default location as well as an alternate detailed location, such as, for example, a location of a particular store of a chain or stores. In an example embodiment, the location correlator 32 accomplishes this by correlating the calling party's location to a near-by called party's chain store. Both called party's locations are provided to the calling party at step 120. In an example embodiment, the locations are provided prior to the called party answering the call. The location can be rendered on the communication device of the calling party, visually (display), acoustically (sound), mechanically (vibration), or any combination thereof. The call is connected to the called party's communications device at step 104. The call is connected to the called party's communications device at step 122.

It is to be understood that FIG. 3, FIG. 4, FIG. 5, and FIG. 6 depict example processes for facilitating party location based services for specific example scenarios. The example processed depicted in FIG. 3, FIG. 4, FIG. 5, and FIG. 6 are not to be construed as the only processes for facilitating party location based services. FIG. 3, FIG. 4, FIG. 5, and FIG. 6 can be combined in any appropriate manner. For example a step or steps depicted in one Figure could be included or removed from another figure.

Figure 7:
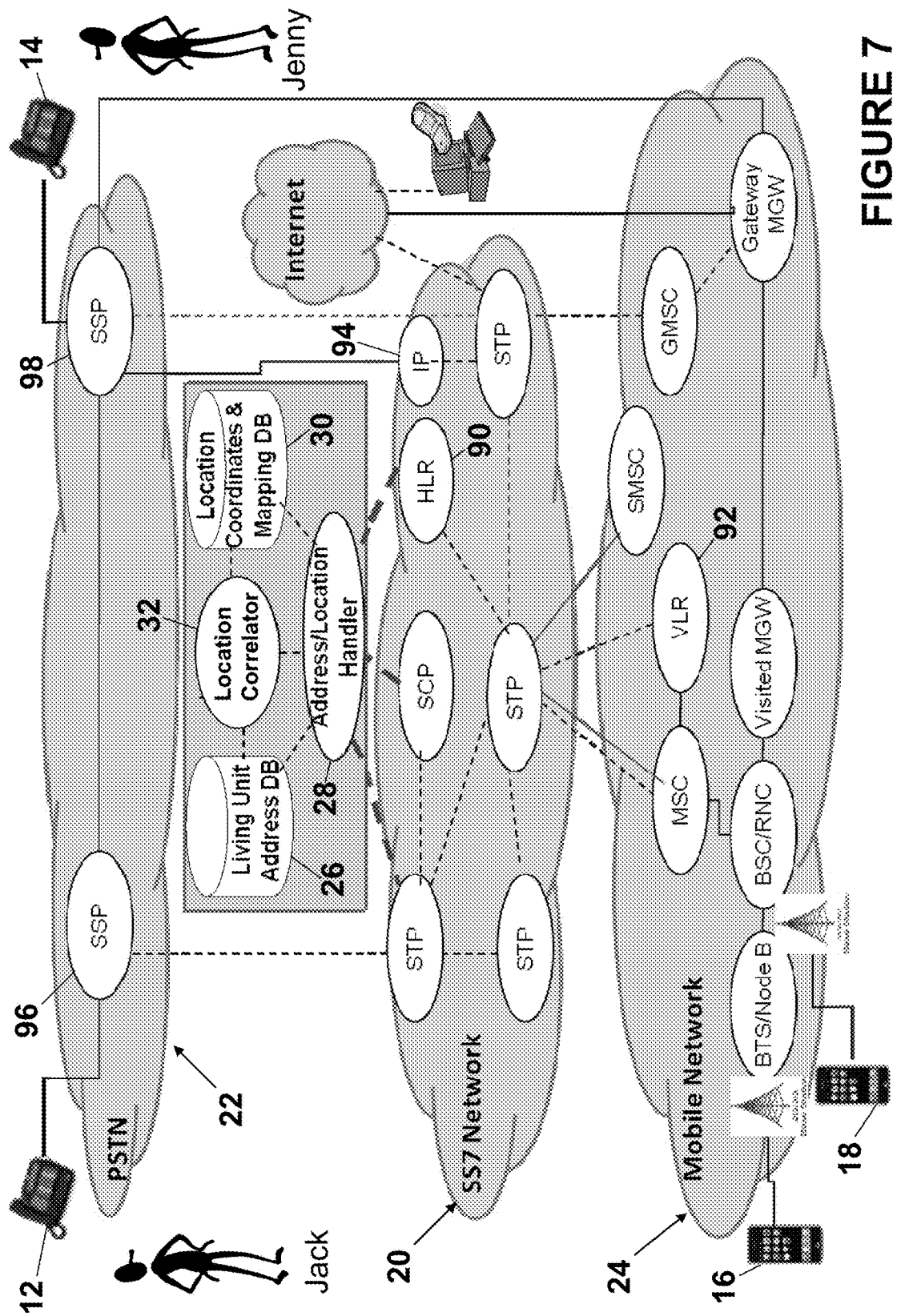
FIG. 7 is an illustration of an example system and method depicting a scenario in which an originating party (calling party) would like to ensure that a called party's number with the same NPA.Nxx as the calling party will not incur unexpected toll charges.

FIG. 7 is an illustration of an example system and method depicting a scenario in which an originating party (calling party) would like to ensure that a called party's number with the same NPA.Nxx as the calling party will not incur unexpected toll charges. In accordance with the example scenario, Jack, shown in the upper left corner of FIG. 7, subscribes to a called party toll charge verification feature, and it is assumed that both Jack and Jenny's (Jenny shown in the upper right corner of FIG. 7) phone numbers have the same NPA-NXX numbers. Jack initiates a call to Jenny. The local switch (e.g., SSP 96 and/or SSP 98) detects that Jack has toll charge verification subscription and forwards both Jack's number and Jenny's number to the address/location handler 28 via the SS7 network 20. The address/location handler 28 determines that a correlation service is needed and forwards the request to the location correlator 32. The location correlator 32 queries the living unit address database 26 and determines that Jenny has ported her phone number to an address which is outside of the rate center domain. The toll charge indicator is returned to the local switch (e.g., SSP 96 and/or SSP 98). And, an announcement is provided to Jack's communication device (e.g., communications device 12) indicating that a toll charge will apply. Jack declines to pay the toll charge and the call is dropped.

Figure 8:
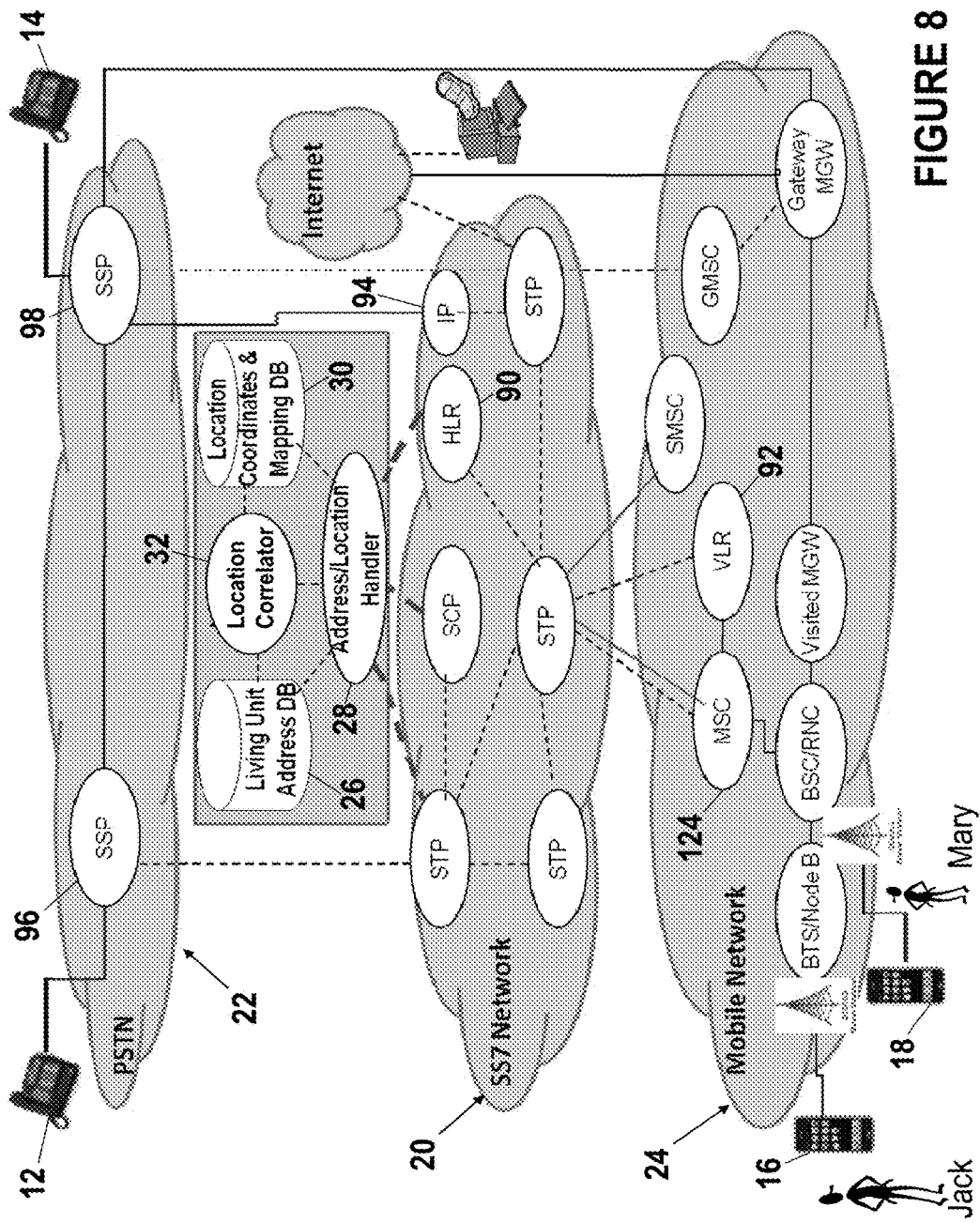
FIG. 8 is an illustration of an example system and method depicting a scenario in which both the originator and called parties subscribe to the called party location tracking feature.

FIG. 8 is an illustration of an example system and method depicting a scenario in which both the originator and called parties subscribe to the called party location tracking feature. When the originating party, Jack (Jack shown in the lower left corner of FIG. 8), utilizing communications device 16, calls the called party, Mary, Jack's grandmother (Mary shown in the lower left corner of FIG. 8), the detailed location of the called party's communications device 18 is delivered to the calling party's communications device 16. Jack subscribes to a called party location monitoring feature. He also helps his Grandmother (Mary) to subscribe and has pre-configured a list of allowed calling party numbers to track her location. Jack initiates a call to Mary. The call is routed to an HLR (e.g., HLR 90) via an MSC (e.g., MSC 124), and the called location tracking feature is detected. The HLR verifies its table and detects that the Mary's number was reported by VLR 92. The call is routed to MSC 124 and VLR 92 for Mary's precise location information. Mary's geo-coordinates are forwarded back to HLR 90, which sends it to address/location handler 28. The address/location handler 28 sends the geolocation to the location correlator 32. The location correlator 32 updates the location coordinates and mapping database 30, and asks the living unit address database 26 and the location coordinates and mapping database 30 to provide Mary's approximate location. The approximate location is returned back to Jack's communications device 16 for rendering thereon.

Figure 9:
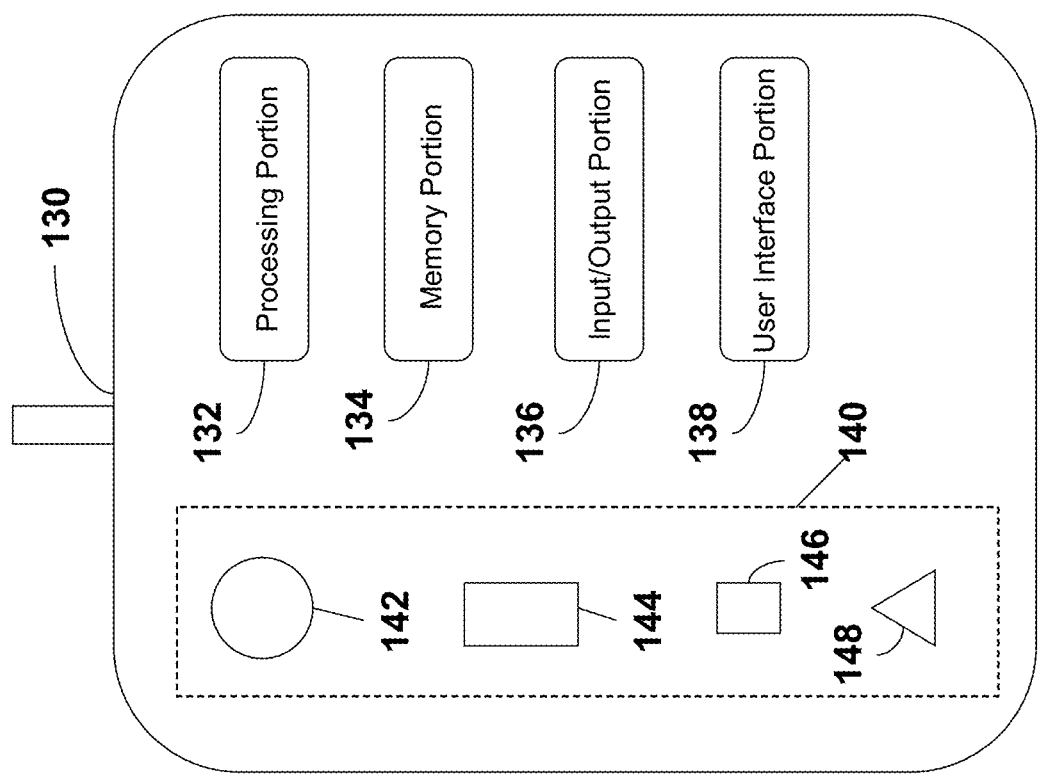
FIG. 9 is a block diagram of an example communications device that is configurable to facilitate party location based services.

FIG. 9 is a block diagram of an example communications device 130 that is configurable to facilitate party location based services. The communications device 130 can include any appropriate device, mechanism, software, and/or hardware for facilitate provisioning of location identification information as described herein. As described herein, the communications device 130 comprises hardware, or a combination of hardware and software. And, each portion of the communications device 130 comprises hardware, or a combination of hardware and software. In an example configuration, the communications device 130 can comprise a processing portion 132, a memory portion 134, an input/output portion 136, a user interface (UI) portion 138, and a sensor portion 140 comprising at least one of a video camera portion 142, a force/wave sensor 144, a microphone 146, a moisture sensor 148, or a combination thereof. The force/wave sensor comprises at least one of a motion detector, an accelerometer, an acoustic sensor, a tilt sensor, a pressure sensor, a temperature sensor, or the like. The motion detector is configured to detect motion occurring outside of the communications device, for example via disturbance of a standing wave, via electromagnetic and/or acoustic energy, or the like. The accelerator is capable of sensing acceleration, motion, and/or movement of the communications device. The acoustic sensor is capable of sensing acoustic energy, such as a noise, voice, etc., for example. The tilt sensor is capable of detecting a tilt of the communications device. The pressure sensor is capable of sensing pressure against the communications device, such as from a shock wave caused by broken glass or the like. The temperature sensor is capable of sensing a measuring temperature, such as inside of the vehicle, room, building, or the like. The moisture sensor 148 is capable of detecting moisture, such as detecting if the communications device 130 is submerged in a liquid. The processing portion 132, memory portion 134, input/output portion 136, user interface (UI) portion 138, video camera portion 142, force/wave sensor 144, and microphone 146 are coupled together to allow communications therebetween (coupling not shown in FIG. 9). The communications device 130 also can comprise a timer (not depicted in FIG. 9).

In various embodiments, the input/output portion 136 comprises a receiver of the communications device 130, a transmitter of the communications device 130, or a combination thereof. The input/output portion 136 is capable of receiving and/or providing information pertaining to facilitating party location based services as described herein. The input/output portion 136 also is capable of communications other communications devices as described herein. For example, the input/output portion 136 can include a wireless communications (e.g., 2.5G/3G/4G) SIM card. In an example embodiment, the input/output portion 136 is capable of receiving and/or sending information to determine a location of the communications device 130. In an example configuration, the input\output portion 136 comprises a GPS receiver. In an example configuration, the communications device 130 can determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 136 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a Wi-Fi finder, a two way GPS chipset or equivalent, or the like.

The processing portion 132 is capable of facilitating party location based services as described herein. The processing portion 132, in conjunction with any other portion of the communications device 130 as needed, can provide the ability for users/subscribers to enable, disable, and configure various features of an application for facilitate provisioning of location identification information, as described herein. The processing portion 132, in conjunction with any other portion of the communications device 130, can enable the communications device 130 to covert speech to text or convert text to speech.

In a basic configuration, the communications device 130 can include at least one memory portion 134. The memory portion 134 can store any information utilized in conjunction with facilitating party location based services as described herein. Depending upon the exact configuration and type of processor, the memory portion 134 can be volatile (such as some types of RAM), non-volatile (such as ROM, flash memory, etc.). The communications device 130 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory portion 134, or a portion of the memory portion 132 is hardened such that information stored therein can be recovered if the communications device 130 is exposed to extreme heat, extreme vibration, extreme moisture, corrosive chemicals or gas, or the like. In an example configuration, the information stored in the hardened portion of the memory portion 134 is encrypted, or otherwise rendered unintelligible without use of an appropriate cryptographic key, password, biometric (voiceprint, fingerprint, retinal image, facial image, or the like). Wherein, use of the appropriate cryptographic key, password, biometric will render the information stored in the hardened portion of the memory portion 134 intelligible.

The communications device 130 also can contain a UI portion 138 allowing a user to communicate with the communications device 130. The UI portion 138 is capable of rendering any information utilized in conjunction facilitating party location based services as described herein. For example, the UI portion 138 can provide means for entering text (including numbers), entering a phone number, rendering text, rendering images, rendering multimedia, rendering sound, rendering video, receiving sound, or the like, as described herein. The UI portion 138 can provide the ability to control the communications device 130, via, for example, buttons, soft keys, voice actuated controls, a touch screen, movement of the mobile communications device 130, visual cues (e.g., moving a hand in front of a camera on the mobile communications device 130), or the like. The UI portion 138 can provide visual information (e.g., via a display), audio information (e.g., via speaker), mechanically (e.g., via a vibrating mechanism), or a combination thereof. In various configurations, the UI portion 138 can comprise a display, a touch screen, a keyboard, a speaker, or any combination thereof. The UI portion 138 can comprise means for inputting biometric information, such as, for example, fingerprint information, retinal information, voice information, and/or facial characteristic information. The UI portion 138 can be utilized to enter an indication of the designated destination (e.g., the phone number, IP address, or the like).

In an example embodiment, the sensor portion 140 of the communications device 130 comprises the video camera portion 142, the force/wave sensor 144, and the microphone 146. The video camera portion 142 comprises a camera (or cameras) and associated equipment capable of capturing still images and/or video and to provide the captured still images and/or video to other portions of the communications device 130. In an example embodiment, the force/wave sensor 144 comprises an accelerometer, a tilt sensor, an acoustic sensor capable of sensing acoustic energy, an optical sensor (e.g., infrared), or any combination thereof.

Figure 10:
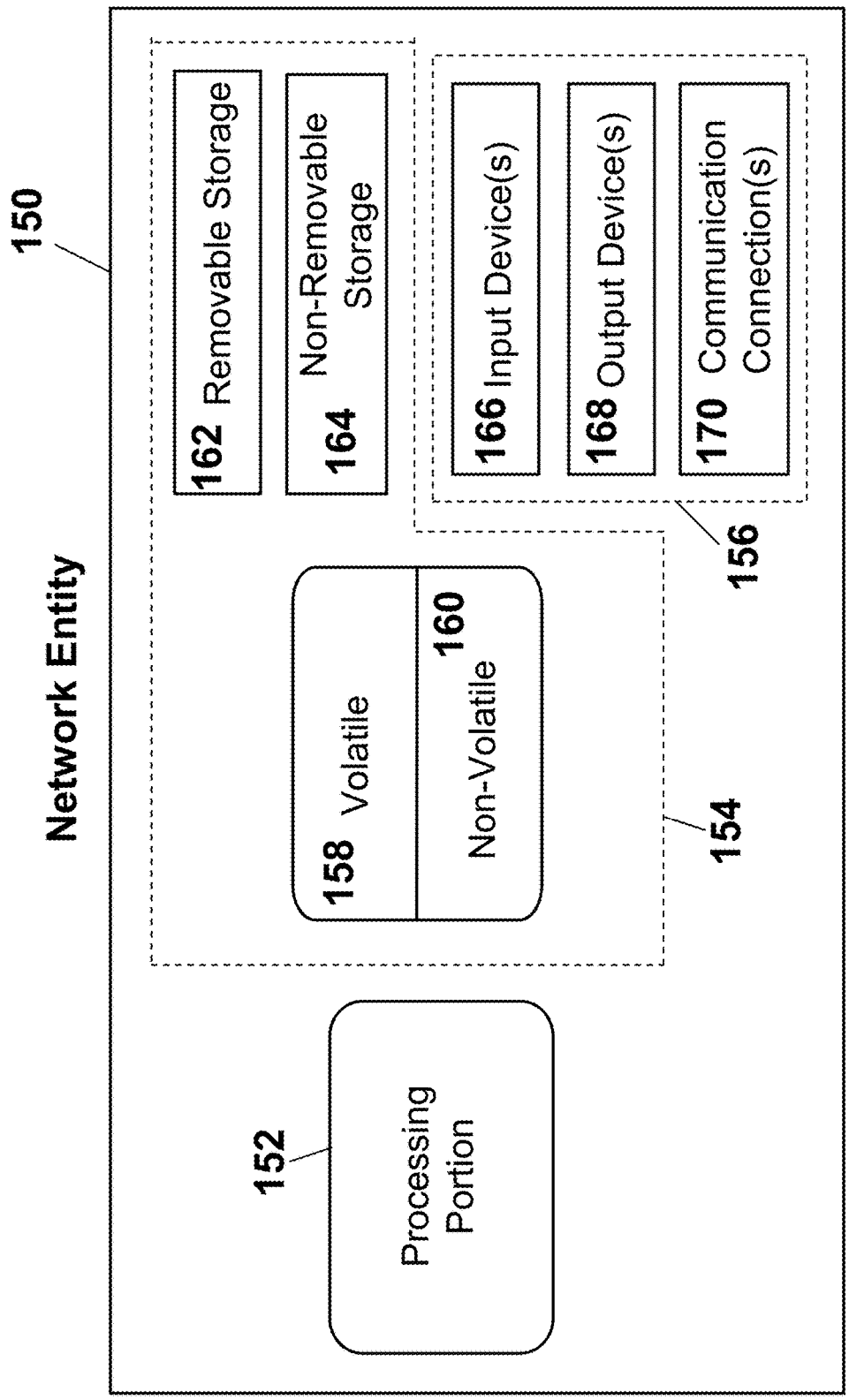
FIG. 10 is a block diagram of an example network entity configurable to facilitate party location based services.

FIG. 10 is a block diagram of an example network entity 150 configurable to facilitating party location based services as described herein. In an example embodiment, the network entity 150 comprises hardware, or a combination of hardware and software. And, each portion of the network entity 150 comprises hardware, or a combination of hardware and software. When used in conjunction with a network, the functionality needed to facilitating party location based services can reside in any one or combination of network entities. The network entity 150 depicted in FIG. 10 represents any appropriate network entity, apparatus, or combination of network entities or apparatuses, such as a processor, a server, a gateway, etc., or any combination thereof. The network entity 150 can represent any individual or combination of entities depicted in FIG. 1. For example, the network entity 150 can represent an SSP, an STP, and SCP, an HLR, an IP, an MSC, a VLR, an SMSC, a GMSC, a gateway MGW, a visited MGW, a SSC, a RNC, a BTS, a NodeB, a living unit address database, a location coordinates and mapping database, an address/location handler, a location correlator, or any appropriate combination thereof. It is emphasized that the block diagram depicted in FIG. 10 is exemplary and not intended to imply a specific implementation or configuration. Thus, the network entity 150 can be implemented in a single processor or multiple processors (e.g., single server or multiple servers, single gateway or multiple gateways, etc.). Multiple network entities can be distributed or centrally located. Multiple network entities can communicate wirelessly, via hard wire, or a combination thereof.

In an example configuration, the network entity 150 comprises a processing portion 152, a memory portion 154, and an input/output portion 156. The processing portion 152, memory portion 154, and input/output portion 156 are coupled together (coupling not shown in FIG. 10) to allow communications therebetween. The input/output portion 156 is capable of receiving and/or providing information from/to a device (e.g., communications device 130, 12, 14, 16, 18)

and/or other network entity configured to be utilized when facilitating party location based services.

The processing portion 152 is capable of performing functions associated with facilitating party location based services, as described herein. For example, the processing portion 152 is capable of, in conjunction with any other portion of the network entity 150 as needed, executing an application, or applications, for facilitating party location based services. The memory portion 154 can store any information utilized in conjunction with facilitating party location based services, as described herein. Depending upon the exact configuration and type of network entity 150, the memory portion 154 can include a computer storage medium, or media, that is volatile 158 (such as dynamic RAM), non-volatile 160 (such as ROM), or a combination thereof. The network entity 150 can include additional storage, in the form of computer storage media (e.g., removable storage 162 and/or non-removable storage 164) including, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory. As described herein, a computer storage medium, also referred to as a computer-readable storage medium, is an article of manufacture, having a concrete physical structure.

The network entity 150 also can contain communications connection(s) 170 that allow the network entity 150 to communicate with other devices, network entities, or the like. A communications connection(s) can comprise communication media. Communication media can be used to communicate computer readable instructions, data structures, program modules, or other data. Communication media can include an appropriate transport mechanism or information delivery media that can be used to transport a modulated data signal such as a carrier wave.

The network entity 150 also can include input device(s) 166 such as keyboard, mouse, pen, voice input device, touch input device, an optical input device, etc. Output device(s) 168 such as a display, speakers, printer, mechanical vibrators, etc. also can be included.

The communications device (e.g., communications device 130, 12, 14, 16, 18) and the network entity (network entity 150) can be part of and/or in communication with various wireless communications networks. Some of which are described below.

Figure 11:
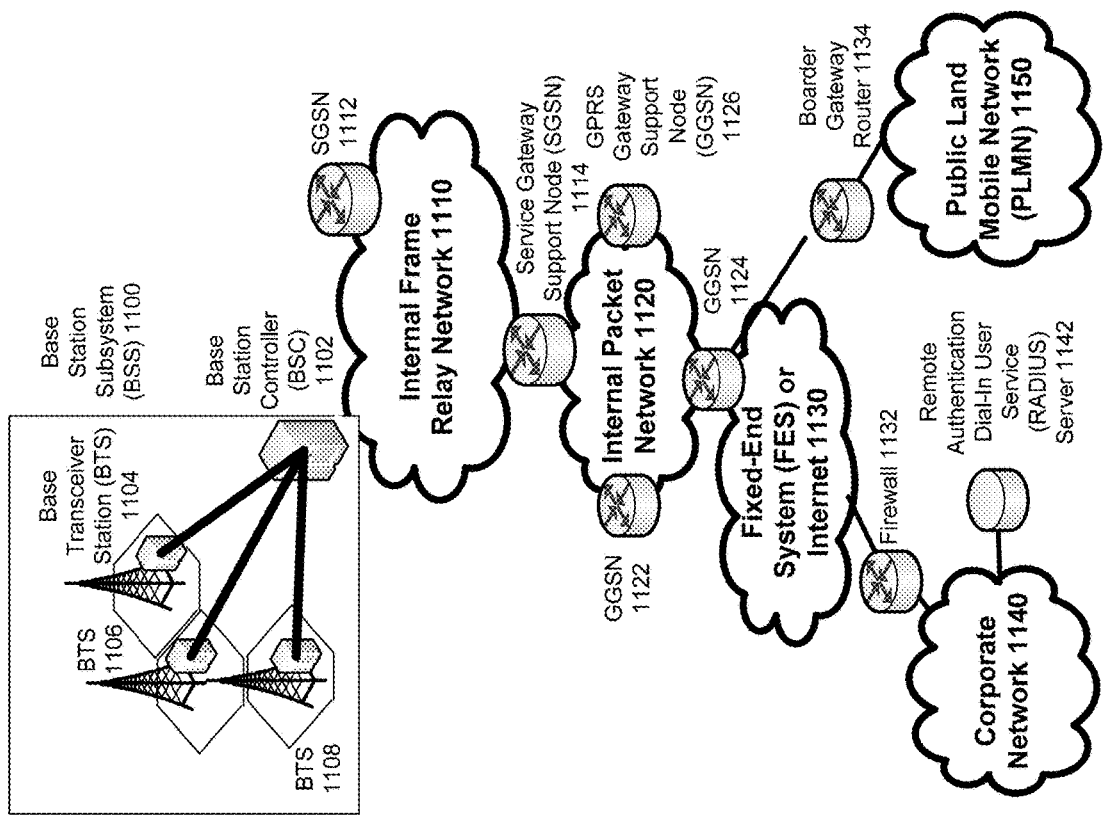
FIG. 11 depicts an overall block diagram of an exemplary packet-based mobile cellular network environment, such as a GPRS network, in which party location based services can be implemented.

FIG. 11 depicts an overall block diagram of an exemplary packet-based mobile cellular network environment, such as a GPRS network, in which party location based services can be implemented. In the exemplary packet-based mobile cellular network environment shown in FIG. 11, there are a plurality of Base Station Subsystems ("BSS") 1100 (only one is shown), each of which comprises a Base Station Controller ("BSC") 1102 serving a plurality of Base Transceiver Stations ("BTS") such as BTSs 1104, 1106, and 1108. BTSs 1104, 1106, 1108, etc. are the access points where users of packet-based mobile devices become connected to the wireless network. In exemplary fashion, the packet traffic originating from user devices is transported via an over-the-air interface to a BTS 1108, and from the BTS 1108 to the BSC 1102. Base station subsystems, such as BSS 1100, are a part of internal frame relay network 1110 that can include Service GPRS Support Nodes ("SGSN") such as SGSN 1112 and 1114. Each SGSN is connected to an internal packet network 1120 through which a SGSN 1112, 1114, etc. can route data packets to and from a plurality of gateway GPRS support nodes (GGSN) 1122, 1124, 1126, etc. As illustrated, SGSN 1114 and GGSNs 1122, 1124, and 1126 are part of internal packet network 1120. Gateway GPRS serving nodes 1122, 1124 and 1126 mainly provide an interface to external Internet Protocol ("IP") networks such as Public Land Mobile Network ("PLMN") 1150, corporate intranets 1140, or Fixed-End System ("FES") or the public Internet 1130. As illustrated, subscriber corporate network 1140 may be connected to GGSN 1124 via firewall 1132; and PLMN 1150 is connected to GGSN 1124 via boarder gateway router 1134. The Remote Authentication Dial-In User Service ("RADIUS") server 1142 may be used for caller authentication when a user of a mobile cellular device calls corporate network 1140.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 12:
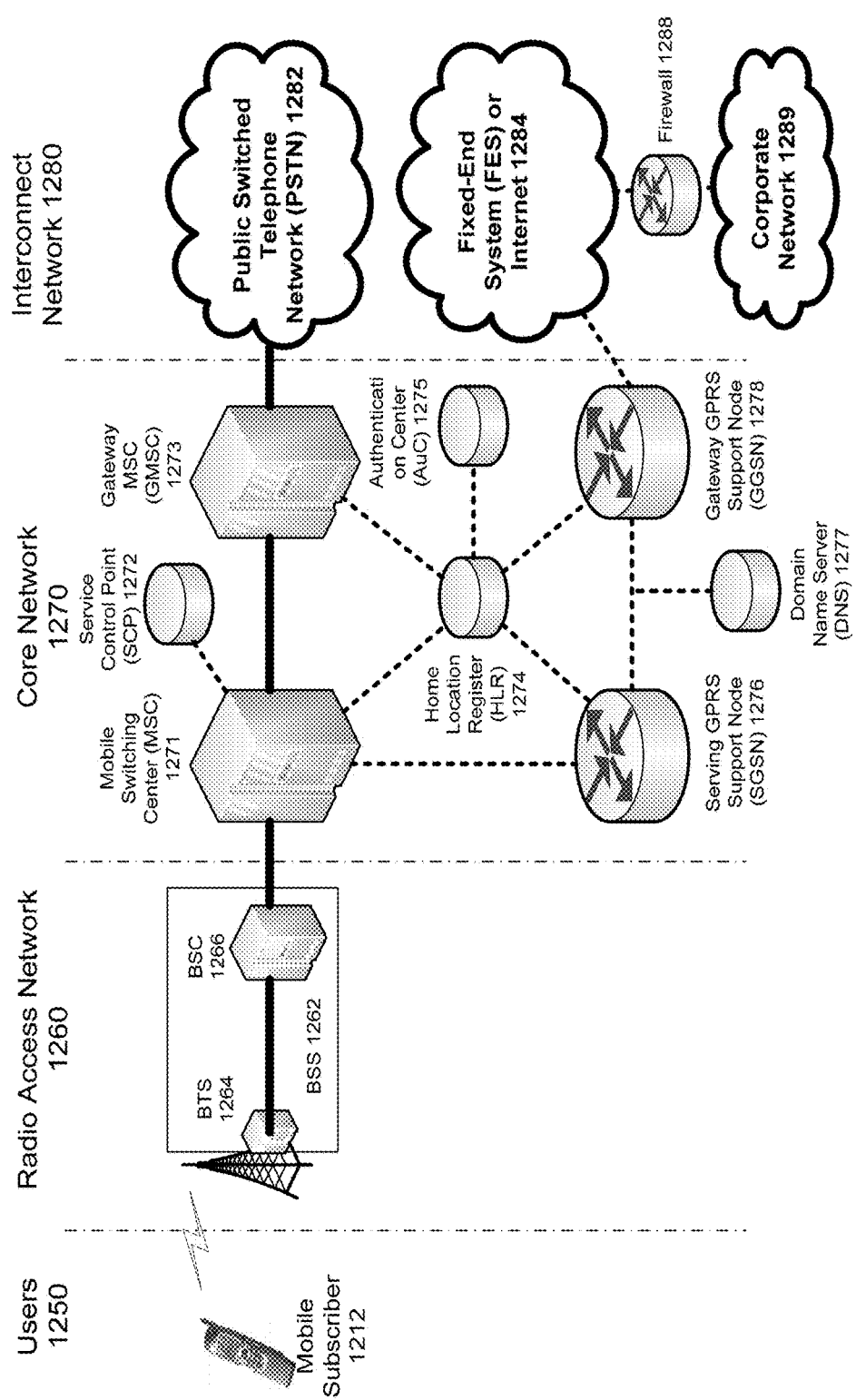
FIG. 12 illustrates an architecture of a typical GPRS network in which party location based services can be implemented.

FIG. 12 illustrates an architecture of a typical GPRS network in which facilitating party location based services can be implemented. The architecture depicted in FIG. 12 is segmented into four groups: users 1250, radio access network 1260, core network 1270, and interconnect network 1280. Users 1250 comprise a plurality of end users. Note, device 1212 is referred to as a mobile subscriber in the description of network shown in FIG. 12. In an example embodiment, the device depicted as mobile subscriber 1212 comprises a communications device (e.g., wireless anti-theft security M2M type device 36). Radio access network 1260 comprises a plurality of base station subsystems such as BSSs 1262, which include BTSs 1264 and BSCs 1266. Core network 1270 comprises a host of various network elements. As illustrated in FIG. 12, core network 1270 may comprise Mobile Switching Center ("MSC") 1271, Service Control Point ("SCP") 1272, gateway MSC 1273, SGSN 1276, Home Location Register ("HLR") 1274, Authentication Center ("AuC") 1275, Domain Name Server ("DNS") 1277, and GGSN 1278. Interconnect network 1280 also comprises a host of various networks and other network elements. As illustrated in FIG. 12, interconnect network 1280 comprises Public Switched Telephone Network ("PSTN") 1282, Fixed-End System ("FES") or Internet 1284, firewall 1288, and Corporate Network 1289.

A mobile switching center can be connected to a large number of base station controllers. At MSC 1271, for instance, depending on the type of traffic, the traffic may be separated in that voice may be sent to Public Switched Telephone Network ("PSTN") 1282 through Gateway MSC ("GMSC") 1273, and/or data may be sent to SGSN 1276, which then sends the data traffic to GGSN 1278 for further forwarding.

When MSC 1271 receives call traffic, for example, from BSC 1266, it sends a query to a database hosted by SCP 1272. The SCP 1272 processes the request and issues a response to MSC 1271 so that it may continue call processing as appropriate.

The HLR 1274 is a centralized database for users to register to the GPRS network. HLR 1274 stores static information about the subscribers such as the International Mobile Subscriber Identity ("IMSI"), subscribed services, and a key for authenticating the subscriber. HLR 1274 also stores dynamic subscriber information such as the current location of the mobile subscriber. Associated with HLR 1274 is AuC 1275. AuC 1275 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 12, when mobile subscriber 1212 initiates the attach process by turning on the network capabilities of the mobile device, an attach request is sent by mobile subscriber 1212 to SGSN 1276. The SGSN 1276 queries another SGSN, to which mobile subscriber 1212 was attached before, for the identity of mobile subscriber 1212. Upon receiving the identity of mobile subscriber 1212 from the other SGSN, SGSN 1276 requests more information from mobile subscriber 1212. This information is used to authenticate mobile subscriber 1212 to SGSN 1276 by HLR 1274. Once verified, SGSN 1276 sends a location update to HLR 1274 indicating the change of location to a new SGSN, in this case SGSN 1276. HLR 1274 notifies the old SGSN, to which mobile subscriber 1212 was attached before, to cancel the location process for mobile subscriber 1212. HLR 1274 then notifies SGSN 1276 that the location update has been performed. At this time, SGSN 1276 sends an Attach Accept message to mobile subscriber 1212, which in turn sends an Attach Complete message to SGSN 1276.

After attaching itself with the network, mobile subscriber 1212 then goes through the authentication process. In the authentication process, SGSN 1276 sends the authentication information to HLR 1274, which sends information back to SGSN 1276 based on the user profile that was part of the user's initial setup. The SGSN 1276 then sends a request for authentication and ciphering to mobile subscriber 1212. The mobile subscriber 1212 uses an algorithm to send the user identification (ID) and password to SGSN 1276. The SGSN 1276 uses the same algorithm and compares the result. If a match occurs, SGSN 1276 authenticates mobile subscriber 1212.

Next, the mobile subscriber 1212 establishes a user session with the destination network, corporate network 1289, by going through a Packet Data Protocol ("PDP") activation process. Briefly, in the process, mobile subscriber 1212 requests access to the Access Point Name ("APN"), for example, UPS.com, and SGSN 1276 receives the activation request from mobile subscriber 1212. SGSN 1276 then initiates a Domain Name Service ("DNS") query to learn which GGSN node has access to the UPS.com APN. The DNS query is sent to the DNS server within the core network 1270, such as DNS 1277, which is provisioned to map to one or more GGSN nodes in the core network 1270. Based on the APN, the mapped GGSN 1278 can access the requested corporate network 1289. The SGSN 1276 then sends to GGSN 1278 a Create Packet Data Protocol ("PDP") Context Request message that contains necessary information. The GGSN 1278 sends a Create PDP Context Response message to SGSN 1276, which then sends an Activate PDP Context Accept message to mobile subscriber 1212.

Once activated, data packets of the call made by mobile subscriber 1212 can then go through radio access network 1260, core network 1270, and interconnect network 1280, in a particular fixed-end system or Internet 1284 and firewall 1288, to reach corporate network 1289.

Figure 13:
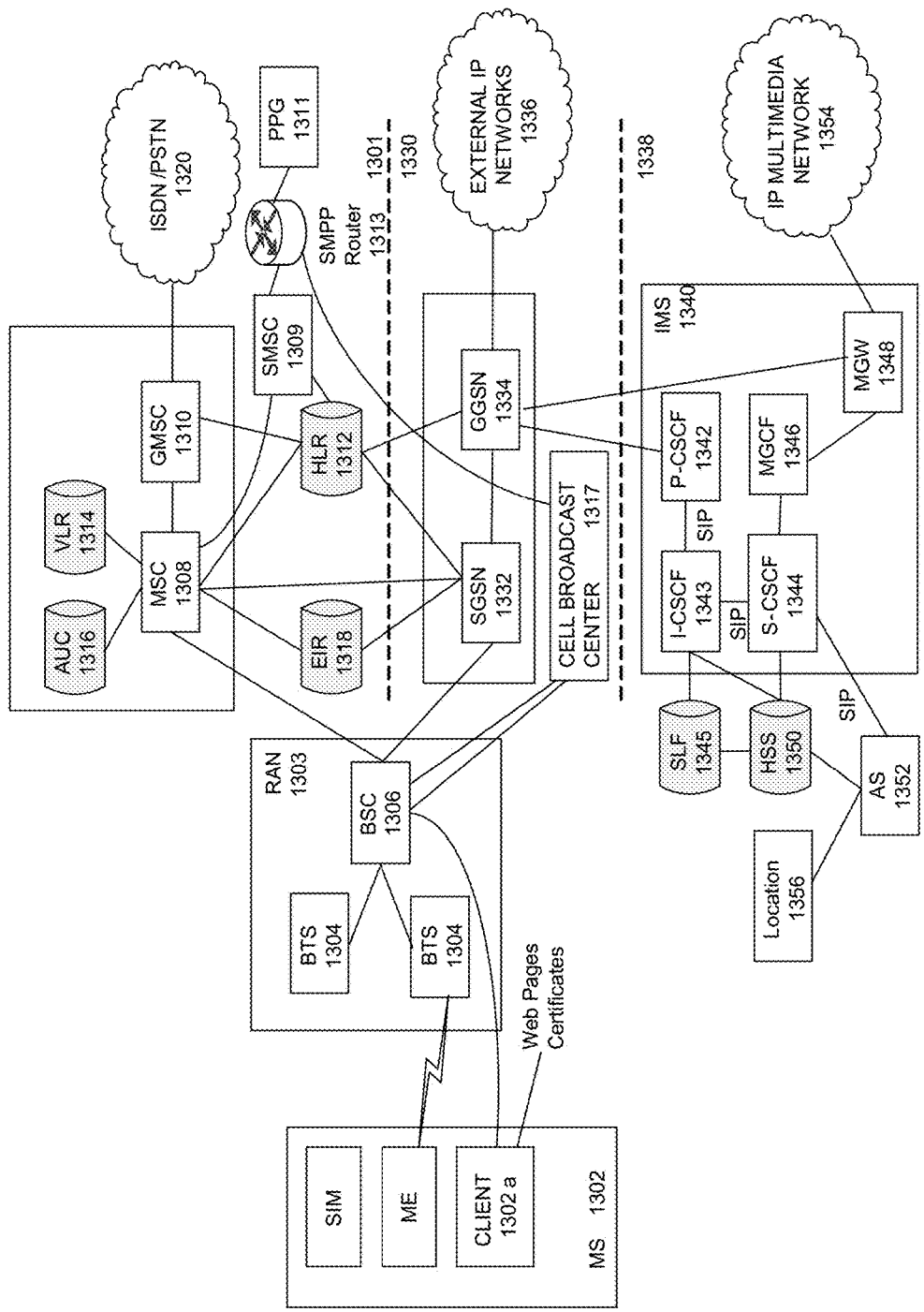
FIG. 13 illustrates an exemplary block diagram view of a GSM/GPRS/IP multimedia network architecture within which party location based services can be implemented.

FIG. 13 illustrates an exemplary block diagram view of a GSM/GPRS/IP multimedia network architecture within which party location based services can be implemented. As illustrated, the architecture of FIG. 13 includes a GSM core network 1301, a GPRS network 1330 and an IP multimedia network 1338. The GSM core network 1301 includes a Mobile Station (MS) 1302, at least one Base Transceiver Station (BTS) 1304 and a Base Station Controller (BSC) 1306. The MS 1302 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1304 is physical equipment, such as a radio tower, that enables a radio interface to communicate with the MS. Each BTS may serve more than one MS. The BSC 1306 manages radio resources, including the BTS. The BSC may be connected to several BTSs. The BSC and BTS components, in combination, are generally referred to as a base station (BSS) or radio access network (RAN) 1303.

The GSM core network 1301 also includes a Mobile Switching Center (MSC) 1308, a Gateway Mobile Switching Center (GMSC) 1310, a Home Location Register (HLR) 1312, Visitor Location Register (VLR) 1314, an Authentication Center (AuC) 1318, and an Equipment Identity Register (EIR) 1316. The MSC 1308 performs a switching function for the network. The MSC also performs other functions, such as registration, authentication, location updating, handovers, and call routing. The GMSC 1310 provides a gateway between the GSM network and other networks, such as an Integrated Services Digital Network (ISDN) or Public Switched Telephone Networks (PSTNs) 1320. Thus, the GMSC 1310 provides interworking functionality with external networks.

The HLR 1312 is a database that contains administrative information regarding each subscriber registered in a corresponding GSM network. The HLR 1312 also contains the current location of each MS. The VLR 1314 is a database that contains selected administrative information from the HLR 1312. The VLR contains information necessary for call control and provision of subscribed services for each MS currently located in a geographical area controlled by the VLR. The HLR 1312 and the VLR 1314, together with the MSC 1308, provide the call routing and roaming capabilities of GSM. The AuC 1316 provides the parameters needed for authentication and encryption functions. Such parameters allow verification of a subscriber's identity. The EIR 1318 stores security-sensitive information about the mobile equipment.

A Short Message Service Center (SMSC) 1309 allows one-to-one Short Message Service (SMS) messages to be sent to/from the MS 1302. A Push Proxy Gateway (PPG) 1311 is used to "push" (i.e., send without a synchronous request) content to the MS 1302. The PPG 1311 acts as a proxy between wired and wireless networks to facilitate pushing of data to the MS 1302. A Short Message Peer to Peer (SMPP) protocol router 1313 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1302 sends a location update including its current location information to the MSC/VLR, via the BTS 1304 and the BSC 1306. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1330 is logically implemented on the GSM core network architecture by introducing two packet-switching network nodes, a serving GPRS support node (SGSN) 1332, a cell broadcast and a Gateway GPRS support node (GGSN) 1334. The SGSN 1332 is at the same hierarchical level as the MSC 1308 in the GSM network. The SGSN controls the connection between the GPRS network and the MS 1302. The SGSN also keeps track of individual MS's locations and security functions and access controls.

A Cell Broadcast Center (CBC) 1317 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1334 provides a gateway between the GPRS network and a public packet network (PDN) or other IP networks 1336. That is, the GGSN provides interworking functionality with external networks, and sets up a logical link to the MS through the SGSN. When packet-switched data leaves the GPRS network, it is transferred to an external TCP-IP network 1336, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1330 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1338 was introduced with 3GPP Release 13, and includes an IP multimedia subsystem (IMS) 1340 to provide rich multimedia services to end users. A representative set of the network entities within the IMS 1340 are a call/session control function (CSCF), a media gateway control function (MGCF) 1346, a media gateway (MGW) 1348, and a master subscriber database, called a home subscriber server (HSS) 1350. The HSS 1350 may be common to the GSM network 1301, the GPRS network 1330 as well as the IP multimedia network 1338.

The IP multimedia system 1340 is built around the call/session control function, of which there are three types: an interrogating CSCF (I-CSCF) 1343, a proxy CSCF (P-CSCF) 1342, and a serving CSCF (S-CSCF) 1344. The P-CSCF 1342 is the MS's first point of contact with the IMS 1340. The P-CSCF 1342 forwards session initiation protocol (SIP) messages received from the MS to an SIP server in a home network (and vice versa) of the MS. The P-CSCF 1342 may also modify an outgoing request according to a set of rules defined by the network operator (for example, address analysis and potential modification).

The I-CSCF 1343, forms an entrance to a home network and hides the inner topology of the home network from other networks and provides flexibility for selecting an S-CSCF. The I-CSCF 1343 may contact a subscriber location function (SLF) 1345 to determine which HSS 1350 to use for the particular subscriber, if multiple HSS's 1350 are present. The S-CSCF 1344 performs the session control services for the MS 1302. This includes routing originating sessions to external networks and routing terminating sessions to visited networks. The S-CSCF 1344 also decides whether an application server (AS) 1352 is required to receive information on an incoming SIP session request to ensure appropriate service handling. This decision is based on information received from the HSS 1350 (or other sources, such as an application server 1352). The AS 1352 also communicates to a location server 1356 (e.g., a Gateway Mobile Location Center (GMLC)) that provides a position (e.g., latitude/longitude coordinates) of the MS 1302.

The HSS 1350 contains a subscriber profile and keeps track of which core network node is currently handling the subscriber. It also supports subscriber authentication and authorization functions (AAA). In networks with more than one HSS 1350, a subscriber location function provides information on the HSS 1350 that contains the profile of a given subscriber.

The MGCF 1346 provides interworking functionality between SIP session control signaling from the IMS 1340 and ISUP/BICC call control signaling from the external GSTN networks (not shown). It also controls the media gateway (MGW) 1348 that provides user-plane interworking functionality (e.g., converting between AMR- and PCM-coded voice). The MGW 1348 also communicates with other IP multimedia networks 1354.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 14:
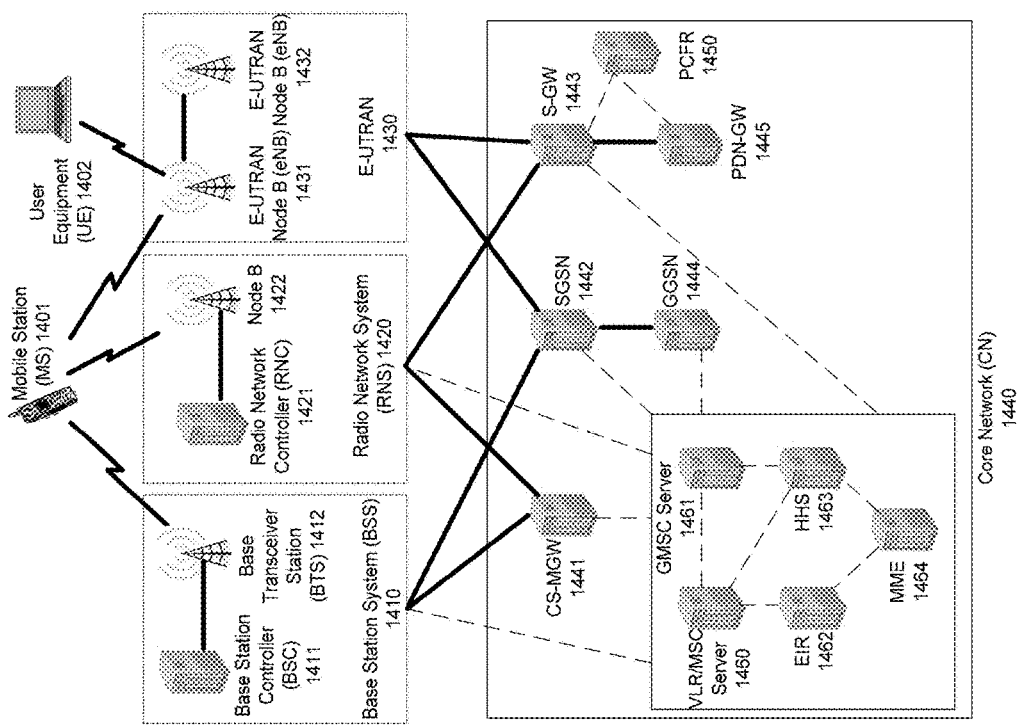
FIG. 14 illustrates a PLMN block diagram view of an exemplary architecture in which party location based services may be incorporated.

FIG. 14 illustrates a PLMN block diagram view of an exemplary architecture in which party location based services may be incorporated. Mobile Station (MS) 1401 is the physical equipment used by the PLMN subscriber. In one illustrative embodiment, any of communications devices 140, 12, 14, 16, or 18 may serve as a Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 14 is the Enhanced Data rates for GSM Evolution (EDGE). EDGE is an enhancement for GPRS networks that implements an improved signal modulation scheme known as 14-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Exemplary data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

While example embodiments of facilitating party location based services have been described in connection with various computing devices/processors, the underlying concepts can be applied to any computing device, processor, or system capable of facilitating party location based services as described herein. The methods and apparatuses for facilitating party location based services, or certain aspects or portions thereof, can take the form of program code (i.e., instructions) embodied in tangible storage media having a concrete physical structure, such as floppy diskettes, CD-ROMs, hard drives, or any other machine-readable storage medium having a concrete physical tangible structure, wherein, when the program code is loaded into and executed by a machine, such as a computer, the machine becomes an apparatus for facilitating party location based services. A computer-readable storage medium, also referred to herein as a computer storage medium, as described herein is an article of manufacture, and thus, not to be construed as a transitory signal. In the case of program code executed on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for facilitating party location based services can be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, or the like, the machine becomes an apparatus for facilitating party location based services. When implemented on a general-purpose processor, the program code combines with the processor to provide a unique apparatus that operates to invoke the functionality of facilitating party location based services.

While party location based services have been described in connection with the various embodiments of the various figures, it is to be understood that other similar embodiments can be used or modifications and additions can be made to the described embodiments for facilitating party location based services. For example, one skilled in the art will recognize that facilitating party location based services as described in the present application may apply to any environment, whether wired or wireless, and may be applied to any number of devices connected via a communications network and interacting across the network. Therefore, facilitating party location based services should not be limited to any single embodiment, but rather should be construed in breadth and scope in accordance with the appended claims.

What is claimed:

1. A method comprising:
   determining, by a communications device, a first geographic location associated with a first calling device, wherein the first geographic location is outside of a geographic area indicated by an area code of a first telephone number identifying the first calling device;
   determining, by the communications device, that the first calling device has initiated a call to a second calling device, the second calling device associated with a called group;
   determining, by the communications device, a charge applicable to a call between the first calling device and a second calling device based on the first geographic location at a first geographic resolution;
   identifying a third calling device associated with the called group based on the first geographic location being closer to the a third geographic location of the third calling device than a second geographic location of the second calling device;
   rerouting the call to the third calling device; and
   indicating to the third calling device, by the communications device, the first geographic location at the first geographic resolution,
   wherein the first geographic resolution is selected from a hierarchy of successively finer geographic resolutions.

2. The method of claim 1, further comprising:
   indicating that a toll charge is applicable to the call based on the first geographic location and a second geographic location associated with the second calling device.

3. The method of claim 2, wherein:
the area code is identical to an area code of a second telephone number, the second telephone number identifying the second calling device.

4. The method of claim 1, wherein the hierarchy comprises at least one of a continent, a country, a state, a county, a metropolis, a city, a town, a street, or an intersection.

5. The method of claim 1, further comprising:
determining a second geographic resolution selected from the hierarchy, the second geographic resolution associated with the second calling device; and
indicating the second geographic location at the second geographic resolution.

6. The method of claim 1, wherein indicating the first geographic location at the first geographic resolution comprises rendering a map.

7. The method of claim 1, wherein the first calling device is associated with a plurality of locations, and determining the first geographic location comprises:
determining a second geographic location, the second geographic location associated with the second calling device; and
selecting the first geographic location from the plurality of locations based on the second geographic location.

8. A communications device comprising:
a processor; and
memory comprising instructions that cause the processor to effectuate operations comprising:
determining a first geographic location associated with a first calling device operating on a network comprising the communications device, wherein the first geographic location is outside of a geographic area indicated by an area code of a first telephone number identifying the first calling device;
determining, by the communications device, that the first calling device has initiated a call to a second calling device, the second calling device associated with a called group;
determining a charge applicable to a call between the first calling device and a second calling device based on the first geographic location at a first geographic resolution;
identifying a third calling device associated with the called group based on the first geographic location being closer to the a third geographic location of the third calling device than a second geographic location of the second calling device;
rerouting the call to the third calling device; and
indicating to the third calling device the first geographic location at the first geographic resolution,
wherein the first geographic resolution is selected from a hierarchy of successively finer geographic resolutions.

9. The communications device of claim 8, the operations further comprising:
indicating that a toll charge is applicable to the call based on the first geographic location and the location of the second calling device.

10. The communications device of claim 9, wherein the area code of the first telephone number and an area code of a second telephone number, the second telephone number identifying the second calling device, are identical.

11. The communications device of claim 8, wherein the hierarchy comprises at least one of a continent, a country, a state, a county, a metropolis, a city, a town, a street, or an intersection.

12. The communications device of claim 8, the operations further comprising:
determining a second geographic resolution selected from the hierarchy, the second geographic resolution associated with the second calling device,
wherein the service comprises providing an indication of the second geographic location at the second geographic resolution to the first calling device.

13. The communications device of claim 8, wherein indicating the first geographic location at the first geographic resolution comprises rendering a map.

14. The communications device of claim 8, wherein:
the first calling device is associated with a plurality of locations, and
determining the first geographic location comprises:
determining a second geographic location, the second geographic location associated with the second calling device; and
selecting the first geographic location from the plurality of locations based on the second geographic location.

* * * * *